(12) United States Patent
Brooks

(10) Patent No.: US 8,488,935 B2
(45) Date of Patent: Jul. 16, 2013

(54) FIBER TO THE PREMISE SERVICE DISCONNECT VIA MACRO-BENDING LOSS

(75) Inventor: Paul D. Brooks, Weddington, NC (US)

(73) Assignee: Time Warner Cable Enterprises LLC, New York, NY (US)

( * ) Notice: Subject to any disclaimer, the term of this patent is extended or adjusted under 35 U.S.C. 154(b) by 525 days.

(21) Appl. No.: 12/732,859

(22) Filed: Mar. 26, 2010

(65) Prior Publication Data

US 2011/0239266 A1 Sep. 29, 2011

(51) Int. Cl.
*G02B 6/00* (2006.01)
*H04J 14/00* (2006.01)
*H04B 10/12* (2006.01)

(52) U.S. Cl.
USPC ............... 385/136; 385/31; 385/32; 385/134; 385/135; 385/147; 398/45; 398/57; 398/66; 398/67; 398/70; 398/71; 398/140; 398/141

(58) Field of Classification Search
USPC ..................................... 398/71, 141; 385/136
See application file for complete search history.

(56) References Cited

U.S. PATENT DOCUMENTS

| | | | |
|---|---|---|---|
| 4,697,869 A | 10/1987 | So | |
| 4,749,248 A | 6/1988 | Aberson, Jr. et al. | |
| 4,902,327 A | 2/1990 | Levinson | |
| 5,627,934 A | 5/1997 | Muhs | |
| 6,330,390 B1 | 12/2001 | Wislinski | |
| 6,542,689 B1 | 4/2003 | Boncek | |
| 6,904,215 B2 | 6/2005 | Christoff | |
| 7,072,560 B1 | 7/2006 | Bramson | |
| 7,272,289 B2 | 9/2007 | Bickham et al. | |
| 7,433,566 B2 | 10/2008 | Bookbinder et al. | |
| 2003/0056217 A1 | 3/2003 | Brooks | |
| 2003/0059149 A1 | 3/2003 | Andrieu | |
| 2005/0041902 A1* | 2/2005 | Frigo et al. | 385/1 |
| 2008/0134165 A1 | 6/2008 | Anderson | |
| 2008/0285927 A1 | 11/2008 | Khan et al. | |
| 2009/0244523 A1 | 10/2009 | Laing | |
| 2011/0318003 A1 | 12/2011 | Brooks | |

OTHER PUBLICATIONS

Macrobend loss downloaded from http://www.its.bldrdoc.gov/fs-1037/images/macrobnc.gif on Sep. 10, 2010.
Jaypee P. Quino and Mark Nolan P. Confesor, "Power Loss Due to Macrobending in an Optical Fiber," 2005, Physics Department, Mindanao State University—Iligan Institute of Tec.

(Continued)

*Primary Examiner* — Ryan Lepisto
(74) *Attorney, Agent, or Firm* — Otterstedt, Ellenbogen & Kammer, LLP

(57) ABSTRACT

It is determined that service is to be disconnected for at least a first subscriber of a video content network employing at least one fiber optic cable. The service to the at least first subscriber is provided from a cross-connect cabinet, over the at least one fiber optic cable, to a premises of the at least first subscriber. Sufficient macro-bending loss is induced in the at least one fiber optic cable so as to cause a signal-to-noise ratio at the premises to degrade such that the service is disconnected. The macro-bending loss is induced in a portion of the at least one fiber optic cable which services only the first subscriber. The macro-bending loss can be induced, for example, by winding about a single mandrel, two mandrels in a figure eight pattern, in a tortuous groove in a tray, and so on.

25 Claims, 12 Drawing Sheets

OTHER PUBLICATIONS

Abstract: Bending-Sensitive Fiber for Macrobend Fiber Sensors, downloaded from http://jjap.ipap.jp/link?JJAP/441920 an Sep. 10, 2010, Japan J. Appl. Phys. 44 2005.

Jun-Ichi Sakai, Microbending Loss Evaluztion in Arbitrary-Index Single-Mode Optical Fibers. Part I: Formulation and General Properties. IEEE J. Quant. Elec. QE-16 1 Jan. 1980.

Jun-Ichi Sakai: Microbending Loss Evaluztion in Arbitrary-Index Single-Mode Optical Fibers. Part II: Effects of Core Index Profiles, IEEE J. Quant. Elec. QE-16 1 Jan. 1980.

Jun-Ichi Sakai & Tatsuya Kimura, Practical Microbending Loss Formula for Single-Mode Optical Fibers, , IEEE J. Quant. Elec. QE-15 6 Jun. 1979.

Charles Industries, Ltd., Charles Fiber Flexibility Pedestals (CFFP) Datasheet, 2009.

DORF, RC, editor, The Electrical Engineering Handbook 2nd ed, CRC Press, Boca Raton, FL 1997 pp. 1083-1095.

* cited by examiner

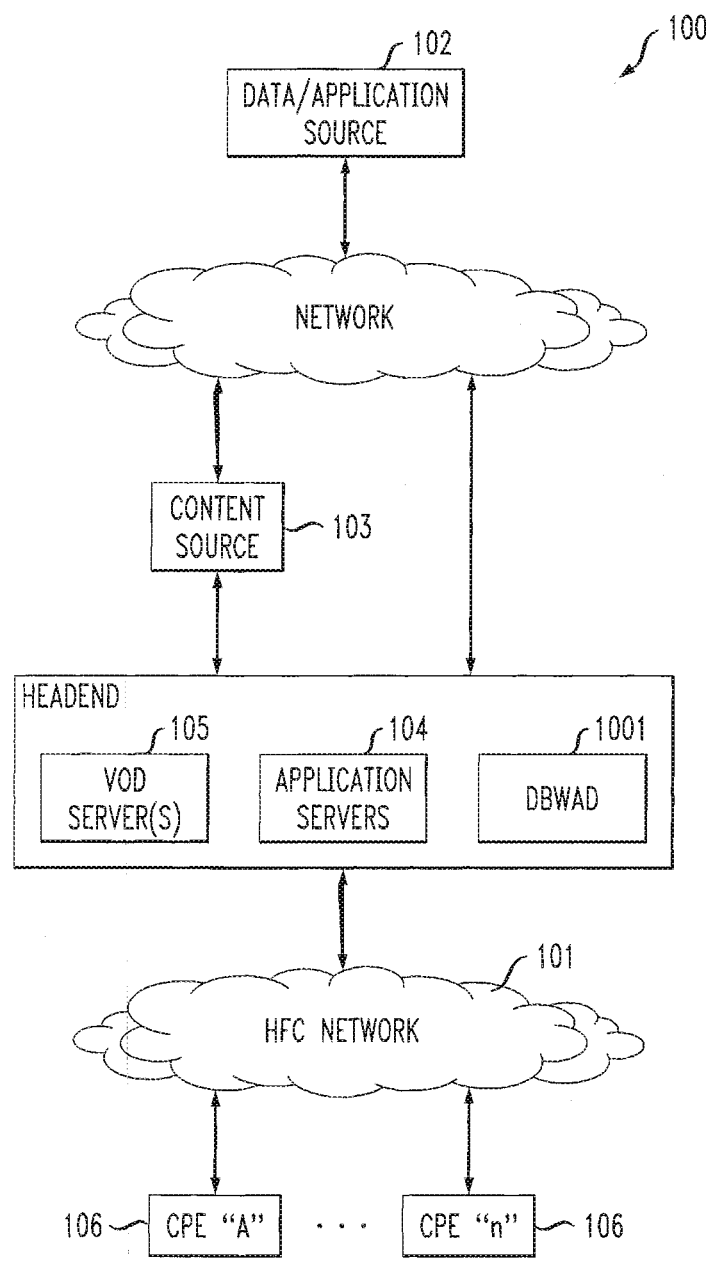

FIBER TO THE PREMISE SERVICE DISCONNECT VIA MACRO-BENDING LOSS

FIELD OF THE INVENTION

The present invention relates generally to the electrical, electronic, and computer arts, and more particularly relates to video content networks employing optical fibers.

BACKGROUND OF THE INVENTION

With the advent of digital communications technology, many TV program streams are transmitted in digital formats. For example, Digital Satellite System (DSS), Digital Broadcast Services (DBS), and Advanced Television Standards Committee (ATSC) program streams are digitally formatted pursuant to the well known Moving Pictures Experts Group 2 (MPEG-2) standard. The MPEG-2 standard specifies, among other things, the methodologies for video and audio data compression allowing for multiple programs, with different video and audio feeds, to be multiplexed in a transport stream traversing a single transmission channel. A digital TV receiver may be used to decode an MPEG-2 encoded transport stream, and extract the desired program therefrom.

The compressed video and audio data are typically carried by continuous elementary streams, respectively, which are broken into access units or packets, resulting in packetized elementary streams (PESs). These packets are identified by headers that contain time stamps for synchronizing, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only includes a multiplex of audio and video PESs, but also other data such as MPEG-2 program specific information (sometimes referred to as metadata) describing the transport stream. The MPEG-2 metadata may include a program associated table (PAT) that lists every program in the transport stream. Each entry in the PAT points to an individual program map table (PMT) that lists the elementary streams making up each program. Some programs are open, but some programs may be subject to conditional access (encryption), and this information (i.e., whether open or subject to conditional access) is also carried in the MPEG-2 transport stream, typically as metadata.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counters may be implemented to ensure that every packet that is needed to decode a stream is received.

A set-top terminal or the like in the home or other premises receives the compressed video and audio data. The set-top terminal typically runs various software applications.

In some instances, the data is provided to the set-top terminal or the like via optical fiber. It is sometimes necessary to perform a service disconnect (or re-connect) for service to a particular home.

SUMMARY OF THE INVENTION

Techniques are provided for fiber to the premise service disconnect via macro-bending loss.

In one aspect, an exemplary method includes the step of determining that service is to be disconnected for at least a first subscriber of a video content network employing at least one fiber optic cable. The service to the at least first subscriber is provided from a cross-connect cabinet, over the at least one fiber optic cable, to a premises of the at least first subscriber. An additional step includes deliberately inducing sufficient macro-bending loss in the at least one fiber optic cable so as to cause a signal-to-noise ratio at the premises to degrade such that the service is disconnected. In the inducing step, the macro-bending loss is induced in a portion of the at least one fiber optic cable which services only the first subscriber.

In another aspect, an exemplary kit of parts for service disconnect of a service provided over at least one fiber optic cable includes a tray structure having at least one of: (i) at least a first mandrel projecting therefrom, the at least first mandrel being configured and dimensioned to effectuate the service disconnect via sufficient macro-bending loss in the at least one fiber optic cable; and (ii) a tray having a tortuous groove therein, the tortuous groove being configured and dimensioned to induce the sufficient macro-bending loss. Also included are a cover securable to the tray structure so as to retain the at least one fiber optic cable in relation to the at least one of the at least first mandrel and the tortuous groove; and a set of instructions directing a user of the kit to carry out at least one of winding the at least one fiber optic cable about the at least first mandrel, and locating the at least one fiber optic cable in the tortuous groove, so as to induce the sufficient macro-bending loss to effectuate the service disconnect.

In still another aspect, an exemplary apparatus includes at least one fiber optic cable, and a tray structure. The tray structure has at least one of: (i) at least a first mandrel projecting therefrom, the at least first mandrel being configured and dimensioned to effectuate service disconnect for a service provided over the at least one fiber optic cable via inducing sufficient macro-bending loss in the at least one fiber optic cable; and (ii) a tray having a tortuous groove therein, the tortuous groove being configured and dimensioned to induce the sufficient macro-bending loss. Also included is a cover secured to the tray structure so as to retain the at least one fiber optic cable in relation to at least one of the at least first mandrel and the tortuous groove. The at least one fiber optic cable is at least one of: (i) wound about the at least first mandrel so as to induce the sufficient macro-bending loss to effectuate the service disconnect; and (ii) located in the tortuous groove so as to induce the sufficient macro-bending loss to effectuate the service disconnect.

In yet another aspect, an exemplary video content network includes a head end; a cross-connect cabinet coupled to the head end; a plurality of macro-bending service disconnect apparatuses located at the cross-connect cabinet; and a plurality of consumer premises terminals coupled to the head end through the plurality of macro-bending service disconnect apparatuses. The plurality of consumer premises terminals are coupled to the plurality of macro-bending service disconnect apparatuses by single strands of optical fiber cable. The plurality of macro-bending service disconnect apparatuses each comprise at least one structural member configured to deliberately induce sufficient macro-bending loss in a corresponding one of the single strands of fiber optic cable so as to cause a signal-to-noise ratio at a corresponding one of the consumer premises terminals to degrade such that service thereto is disconnected. The service provided over the corresponding one of the single strands of fiber optic cable in which the macro-bending loss is deliberately induced comprises at least a cable television service.

As used herein, "facilitating" an action includes performing the action, making the action easier, helping to carry the action out, or causing the action to be performed.

Thus, by way of example and not limitation, instructions executing on one processor might facilitate an action carried out by instructions executing on a remote processor, by sending appropriate data or commands to cause or aid the action to be performed.

These and other features and advantages of the present invention will become apparent from the following detailed description of illustrative embodiments thereof, which is to be read in connection with the accompanying drawings.

BRIEF DESCRIPTION OF THE DRAWINGS

FIG. 1 is a functional block diagram illustrating an exemplary hybrid fiber-coaxial (HFC) network configuration;

DETAILED DESCRIPTION OF PREFERRED EMBODIMENTS

Figure 1A:
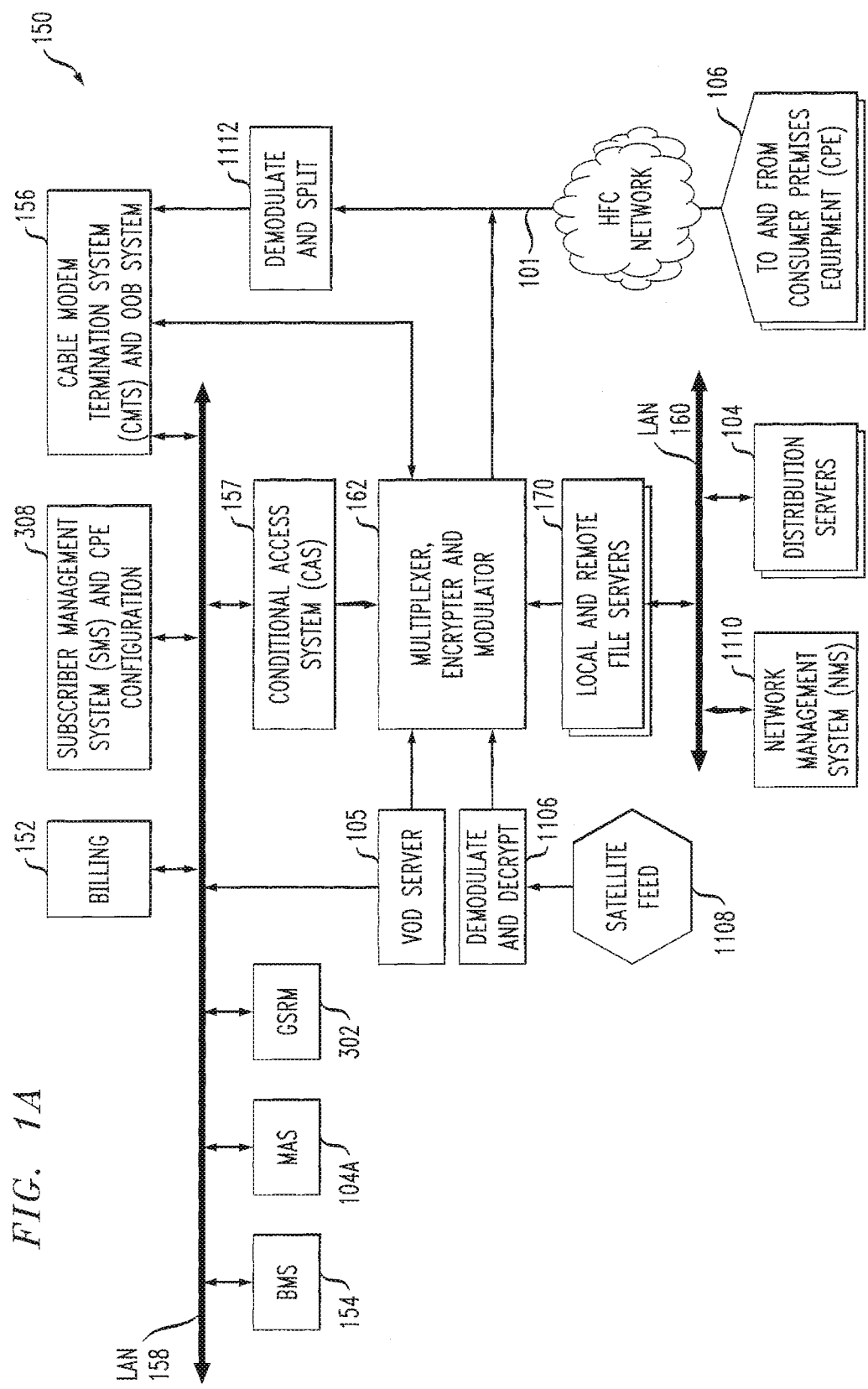
FIG. 1A is a functional block diagram illustrating one exemplary cable network head-end configuration.

It is currently envisioned that one significant application of one or more embodiments of the invention is in the context of a video content network, such as a fiber-to-the-premises (FTTP) network, wherein optical fiber enters the premises and there is a point where a particular optical fiber is associated with service to a single premises or subscriber. The network may also provide high-speed data services, such as Internet access.

Initially, the complete disclosure of United States Patent Application Publication 2008/0134165 of Anderson et al. entitled "Methods and apparatus for software provisioning of a network device," published on Jun. 5, 2008, is expressly incorporated herein by reference in its entirety for all purposes. FIG. 1 illustrates a typical content-based network configuration 100. The various components of the network 100 include (i) one or more data and application origination points 102; (ii) one or more content sources 103, (iii) one or more application distribution servers 104; (iv) one or more video-on-demand (VOD) servers 105, and (v) consumer (or customer) premises equipment (CPE) 106. Also included is a dynamic bandwidth allocation device (DBWAD) 1001; non-limiting examples include a session resource manager or global session resource manager. The distribution server(s) 104, VOD servers 105, DBWAD 1001, and CPE(s) 106 are connected via a bearer (e.g., HFC) network 101. A simple architecture is shown in FIG. 1 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 1A (described in greater detail below) may be used.

It should be noted at this point that in addition to a conventional HFC network or a switched digital network to be discussed below, other kinds of video content networks can be employed for network 101 (e.g., fiber-to-the-home (FTTH) (also referred to herein as FTTP) or fiber-to-the-curb (FTTC)).

The data/application origination point 102 comprises any medium that allows data and/or applications (such as a VOD-based or "Watch TV" application) to be transferred to a distribution server 104. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill.

The application distribution server 104 comprises a computer system where such applications can enter the network system. Conventional distribution servers are well known in the networking arts.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the customers' premises (or other appropriate locations) that can be accessed by a distribution server 104; for example, set-top terminal (STT), digital set-top box (DSTB), set-top box (STB), or simply "box," and the like.

Referring now to FIG. 1A, one exemplary embodiment of a head-end architecture is described. As shown in FIG. 1A, the head-end architecture 150 comprises typical head-end components and services including billing module 152, subscriber management system (SMS) and CPE configuration management module 308, cable-modem termination system (CMTS) and out-of-band (OOB) system 156, as well as LAN(s) 158, 160 placing the various components in data communication with one another. It will be appreciated that while a bar or bus LAN topology is illustrated, any number of other arrangements (e.g., ring, star, etc.) may be used consistent with the invention. It will also be appreciated that the head-end configuration depicted in FIG. 1A is high-level, conceptual architecture and that each multi-service operator or multiple system operator (MSO) may have multiple head-ends deployed using custom architectures.

The architecture 150 of FIG. 1A further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158 as well, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (see FIG. 1B) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo. 80027, USA) and associated protocols. The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 1A are a global session resource manager (GSRM) 302, a Mystro Application Server 104A, and a business management system 154, all of which are coupled to LAN 158. GSRM 302 is a non-limiting example of a DBWAD 1001.

Figure 1B:
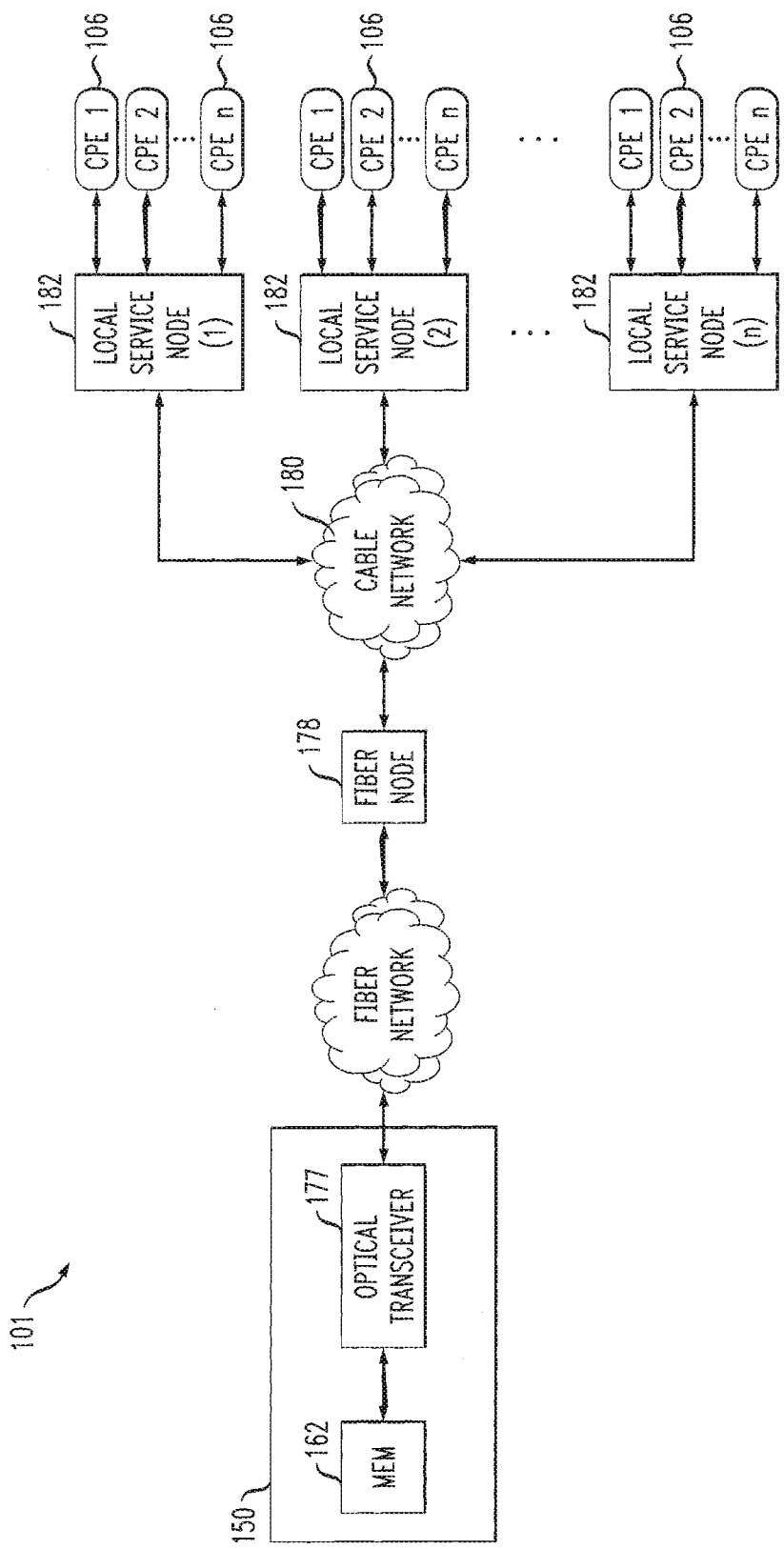
FIG. 1B is a functional block diagram illustrating one exemplary local service node configuration in an HFC network.

As shown in FIG. 1B, the network 101 of FIGS. 1 and 1A comprises a fiber/coax arrangement wherein the output of the MEM 162 of FIG. 1A is transferred to the optical domain (such as via an optical transceiver 177 at the head-end or further downstream). The optical domain signals are then distributed to a fiber node 178, which further distributes the signals over a distribution network 180 to a plurality of local servicing nodes 182. This provides an effective 1:N expansion of the network at the local service end.

Figure 1C:
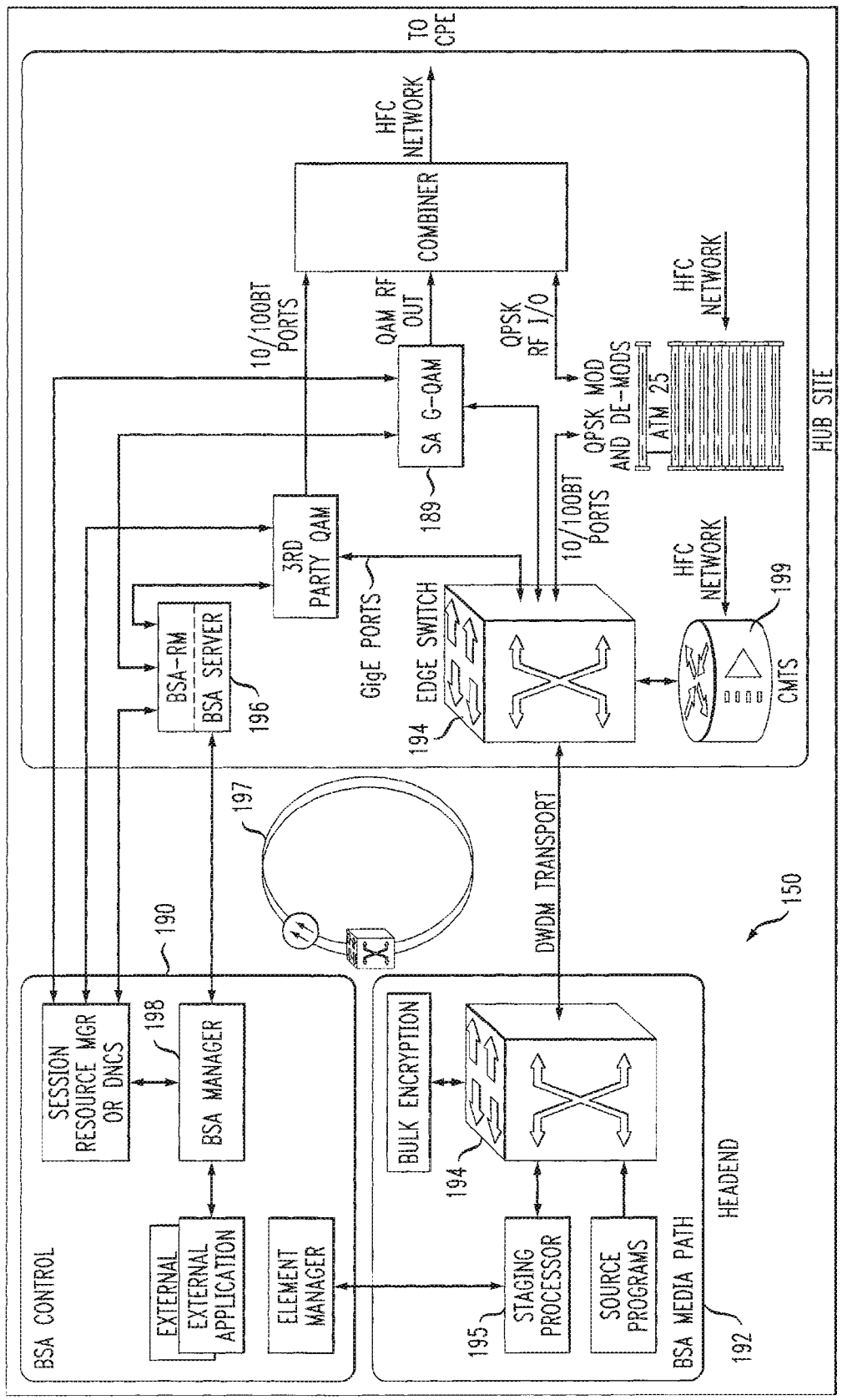
FIG. 1C is a functional block diagram illustrating one exemplary broadcast switched architecture (BSA)

FIG. 1C illustrates an exemplary "switched" network architecture. While a so-called "broadcast switched architecture" or BSA network is illustrated in this exemplary embodiment, it will be recognized that other architectures could be employed.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1C shows the implementation details of one exemplary embodiment of this broadcast switched network architecture. Specifically, the head-end 150 contains switched broadcast control and media path functions 190, 192 (the latter including staging processor 195); these elements cooperate to control and feed, respectively, downstream or edge switching devices 194 at the hub site which are used to selectively switch broadcast streams to various service groups. One of those broadcast streams that can be switched is the Object Carousel. A BSA server 196 is also disposed at the hub site, and implements functions related to switching and bandwidth conservation (in conjunction with a management entity 198 disposed at the head-end). An optical transport ring 197 is utilized to distribute the dense wave-division multiplexed (DWDM) optical signals to each hub in an efficient fashion.

With respect to FIG. 1C, note that in some current head ends (e.g., those using technology from Motorola, Inc., Schaumburg, Ill., USA) there is no GSRM or SRM or digital network control system (DNCS); rather, VOD vendors implement required functionality in their own proprietary way. In other head end configurations, such as in those implemented by Time Warner Cable, Inc, New York, N.Y., USA, session resource management functionality can be employed. Accordingly, it should be understood that the embodiments herein are exemplary and non-limiting.

US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted.

In addition to "broadcast" content (e.g., video programming), the systems of FIGS. 1A-1C may also deliver Internet data services using the Internet protocol (IP), although other protocols and transport mechanisms of the type well known in the digital communication art may be substituted. One exemplary delivery paradigm comprises delivering MPEG-based video content, with the video transported to user personal computers (PCs) (or IP-based set-top boxes (STBs)) over DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream quadrature amplitude modulation (QAM) channels (QAMs) to the tuner of the user's STB or other receiver device for viewing on the television, and also as packetized IP data over the DOCSIS QAMs to the user's PC or other IP-enabled device via the user's cable modem.

Referring again to FIG. 1C, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component. Note also that edge switch 194 in block 150 in FIG. 1C can, in the most general case, be the same or different as that shown in the hub site of FIG. 1C. Also, in other embodiments, CMTS 199 could be located in a place other than the hub site.

The edge switch 194 forwards the packets received from the CMTS 199 to the QAM modulator 189, which transmits the packets on one or more physical (QAM-modulated RF) channels to the CPEs. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Figure 1D:
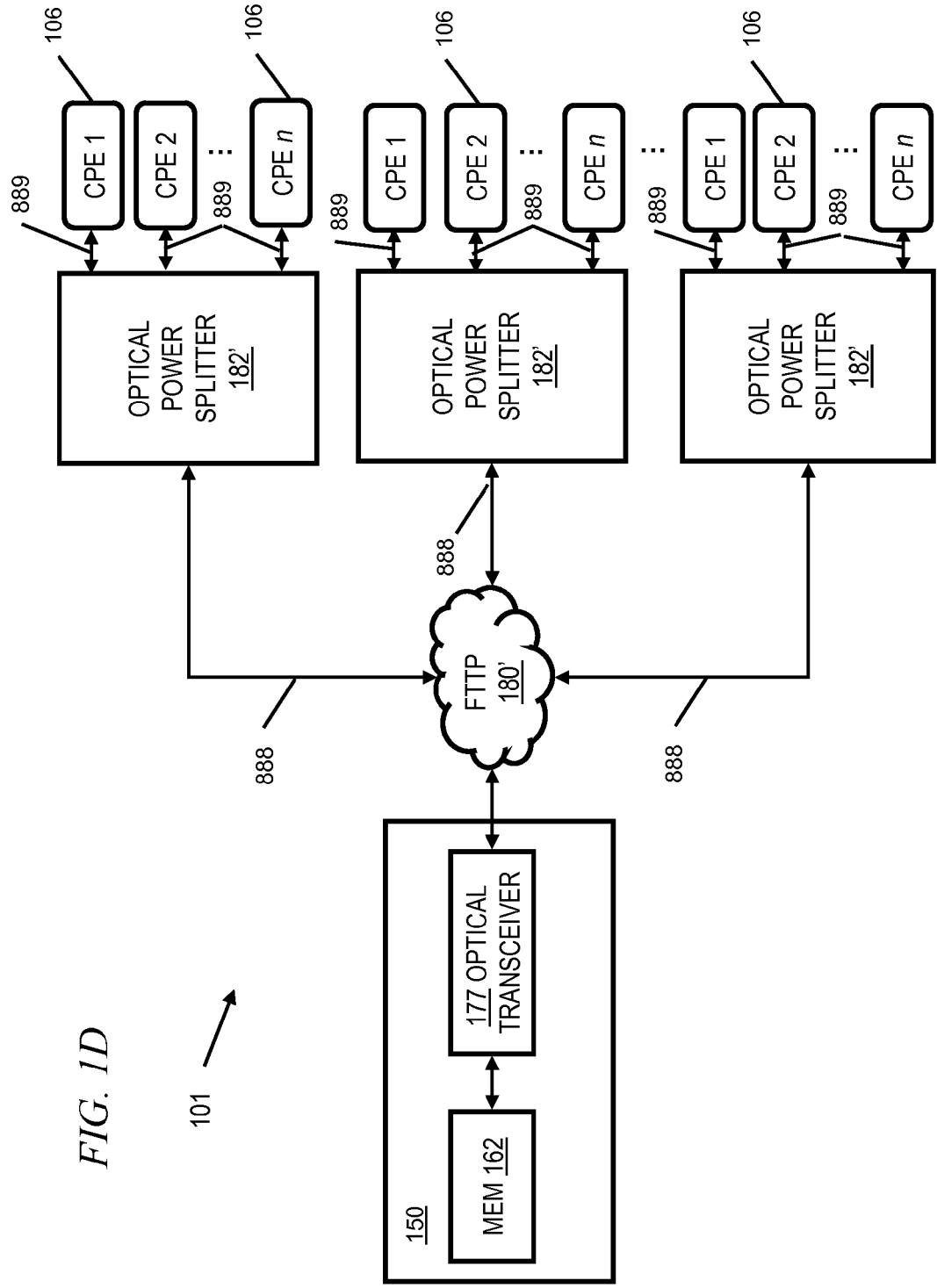
FIG. 1D is a functional block diagram illustrating one exemplary local service node configuration in an FTTP network.

The configurations shown in FIGS. 1-1D are exemplary in nature and different approaches may be used in other embodiments; such other approaches may have more or less functionality (for example, high speed Internet data services might be omitted in some cases). FIG. 1D is discussed below.

In fiber networks, there is often, on the fiber, a color of light (wavelength) that carries cable television channels in a format that is relatively easy to receive by a television set. All that is really necessary is that the light is detected; since it is linear analog light, the resulting detected waveforms include cable channels. If any of those cable channels are being transmitted "in the clear," so that QAM tuner TVs can receive them, such channels are directly viewable by consumers. Furthermore, even though the digital versions of certain programs may be encrypted, the analog versions contained in the given wavelength are typically clear. This makes it possible for an unscrupulous person or entity to build a device to steal service—all the consumer needs to do is to terminate the fiber present at the home or other premises, connect a low-cost detection device, and hook the same up to the TV (television).

While this is presently difficult to do, mere difficulty may not be sufficient for securing of content. Thus, as a result, whenever a signal is carried "in the clear" using linear analog optics, it is preferable to provide a service disconnect to prevent theft of services. Service disconnects are also useful to prevent the malicious injection of light into the upstream network, which could result in making the upstream network unusable for functions such as selecting video-on-demand titles or changing channels in a switched digital video application.

By way of recapitulation and provision of additional exemplary detail, FTTP networks (also known as Passive Optical "PON" Networks) typically employ a single strand of optical fiber originating at the service provider's facility (end-office, distribution hub, outdoor enclosure, and the like). This single strand of fiber (or single wavelength within the strand) connects the facility to the proximate location of, and provides connectivity to multiple subscribers (residences or businesses). Optical signals to and from this group of subscribers share the optical connection to the service provider. This topology is commonly referred to as "tree and branch." A tree and branch topology is favored for this application because it conserves expensive fiber resources for the "backhaul" (facility to proximate location) portion of the network through the sharing of the fiber strand (or sharing of a wavelength within the strand). It is distinct from the "star" topology, which requires either a dedicated fiber strand all the way from the facility to the customer, or a dedicated wavelength within that strand.

With reference to FIG. 1D, which is otherwise similar to FIG. 1B, rather than transitioning from fiber to a (coaxial) cable network in fiber node 178 as in FIG. 1B, an FTTP scheme 180' is employed. Elements 182' are cross-connect cabinets (which may, as noted in the figure, include optical power splitters, and which are typically outdoors or buried; note also that in some cases there may be individual home-run fibers so that there is not an optical splitter in the cabinet, but a service connect-disconnect device may still be provided), which are connected to the service provider's facility by several miles of single-strand fiber optic cable 888. Elements 182' may also include service disconnect functionality in accordance with one or more embodiments of the invention. A few thousand feet of single strand fiber cable 889 may be used, for example, to connect elements 182' to each premises (home or business) of a subscriber including CPE 106. Thus, after splitting in location 182', the single fiber cables 889 each provide service to a single subscriber, such that upon undergoing macro-bending loss for the purposes of service disconnect, only a single subscriber's service is disconnected.

Although the tree and branch topology is favored in the majority of today's FTTP deployments, an important disadvantage is that it is not possible to physically disconnect service to an individual subscriber at the facility end of the connection. Some type of access control is desirable to prevent service theft. When physical disconnection is used as the access control method, it has the additional advantage of preventing unauthorized and/or malicious injection of signals into the network. This has not been a major concern because of the following reasons:

1) FTTP networks that exclusively use digital baseband modulation (on-off keying (OOK) or variants such as quadrature phase shift keying (QPSK) or QAM) can perform a service disconnect merely by de-authorizing operator-owned or managed subscriber premise equipment 106. This access control method, however, still leaves the network open to malicious injection of interfering optical signals, although the fixed location of the interference source simplifies discovery and remediation of any attack.

2) FTTP networks that employ linear analog modulation, either in the downstream only direction (some variants of Gigabit-capable passive optical network (GPON)) or in both directions (radio frequency over glass (RFoG)) are susceptible to both theft of service and unauthorized and/or malicious signal injection. Such theft of service is difficult or impossible to remotely detect and localize (upstream malicious light injection is fairly easy to detect, but detecting theft of service requires use of expensive equipment to check the individual's fiber). However, the difficulty of the hook-up and general unavailability of compatible terminal equipment has provided a de facto barrier to both.

Because of concerns that above reason number two is only a temporary barrier, deployments of FTTP networks that provide service using linear analog modulation typically use a physical service disconnect at a location proximate to the subscriber. This physical disconnect generally employs an optical connector but may also be done by cutting the fiber strand at a point in the network where the strand feeds only one subscriber. Thus, there are currently two ways to perform service connects and disconnects. One involves use of a connector system which is plugged and unplugged. Optical connectors are very sensitive to contamination, are fragile and damage-prone, and are somewhat expensive to provide and install. An alternative is to actually cut the fiber and use a mechanical splice instead of a connector. Cutting and splicing is relatively expensive, tends to be craft-sensitive and time-consuming, and causes the fiber to become shorter and shorter with each connect/disconnect cycle. By way of clarification, cutting and splicing is relatively inexpensive as a component cost of a restoration effort (compared to, for example, trenching, labor, trucks, tools, overhead, and so on). However, when viewed as a component cost of service disconnect or reconnect, cutting and splicing is indeed a significant cost. Furthermore, both connectors and splices have reliability concerns. In addition, the acceptable splice quality in linear analog optics is relatively high, as compared to baseband digital service, due to greater concern with reflection from the splice. In at least some instances, connectors must have an angle polished into the end.

Optical fiber exhibits a property called macro-bending loss. This phenomenon occurs when the optical fiber is bent over a small enough radius such that some of the light begins to leak into the cladding of the fiber, causing loss of part of the light. As the bending continues, more and more light is lost until a point is reached where there is so little light that reception becomes noisy and the signal is no longer recoverable. Macro-bending loss should not be confused with micro-bending loss (light attenuation induced by deformation of the fiber).

The minimum bending radius due to mechanical considerations will vary with different fiber optic cable designs. The manufacturer typically specifies the minimum radius to which the cable may safely be bent during installation, and for the long term. The former is typically somewhat shorter than the latter. The minimum bend radius is in general also a function of tensile stresses, e.g., during installation, while being bent around a sheave while the fiber or cable is under tension.

Macro-bending loss can be defined as the case where a bend in the optical waveguide causes a light wave within the fiber to exceed the critical angle needed to maintain total internal reflection and to enter the cladding material; i.e., leakage of light through the fiber cladding. This loss is very predictable in a given fiber type. In most telecommunication fiber types in widespread use, radii needed to induce significant macro-bending loss are achieved prior to the point at which mechanical damage to the fiber occurs. This characteristic can be used to construct optical attenuators with very predictable loss characteristics.

Fiber can be purposefully designed with greater or lesser amounts of macro-bending loss; for instance, fiber used for high density installations (office buildings and high rise apartments) can benefit from reduced macro-bending loss radii to allow ease of installation. At the other extreme, fiber can be designed for enhanced macro-bending losses in sensing applications where the amount of loss is used to indicate deflection of a sensor system.

Figure 2:
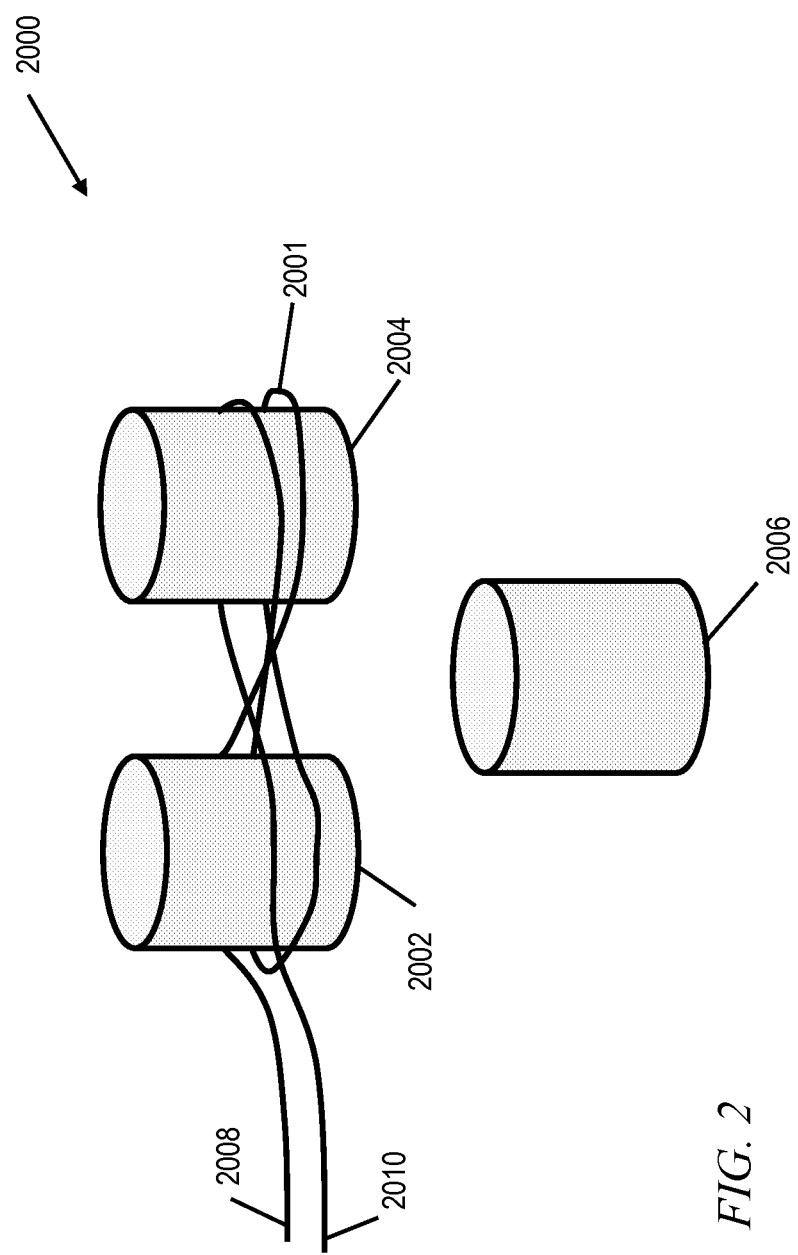
FIG. 2 shows portions of an exemplary embodiment of a service connect-disconnect apparatus, in a "disconnected" mode, in accordance with an aspect of the invention.
Figure 6:
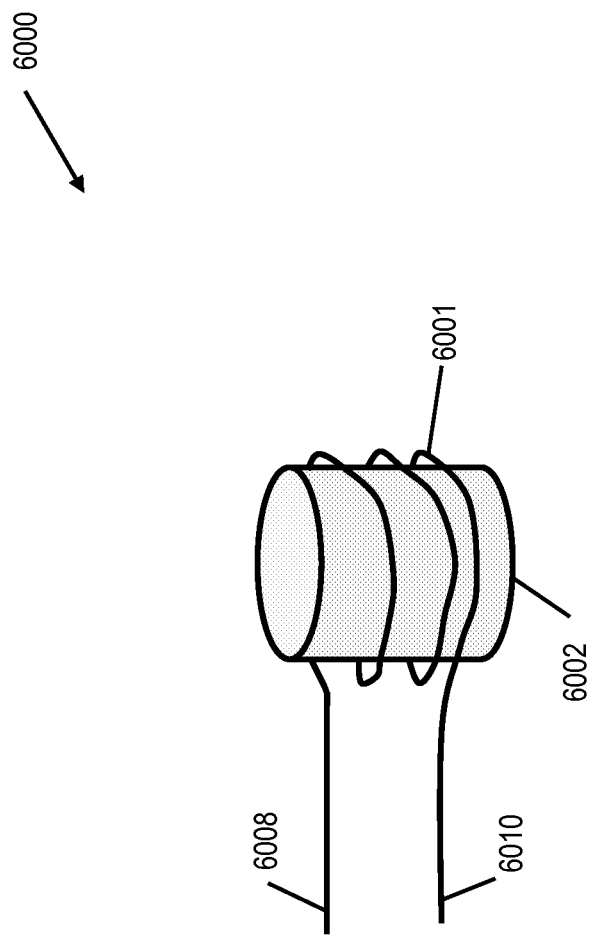
FIG. 6 shows portions of another exemplary embodiment of a service connect-disconnect apparatus, according to yet another aspect of the invention.

Embodiments of the invention leverage the macro-bending characteristic to perform a service disconnect. One or more mandrels are provided and the diameter of the mandrels is selected such that there is no danger of (mechanically) damaging the cable and yet the diameter is small enough to induce macro-bending loss. In some embodiments, a figure-eight shape is employed, as shown in FIG. 2, which has the advantage of not putting a twist in the cable. One possible embodiment involves two mandrels 2002, 2004. The fiber 2001 is wound in the aforementioned "figure-eight" around these two mandrels. The figure-eight configuration is advantageous because it does not impose cumulative twisting of the fiber, and thus is potentially less stressful to the fiber, more stable, and easier to wrap. However, a simple single round mandrel 6002 could be employed, as shown in FIG. 6, with the number of turns and the diameter required to induce macro-bending loss being dependent on the properties of the fiber optic cable 6001.

FIG. 2 thus illustrates exemplary details 2000 of a service connect-disconnect device. A full-strength signal may be present on network feed 2008, which signal is then effectively disconnected by wrapping the fiber strand 2001 in a figure-eight around the two mandrels 2002, 2004. The signal at the feed 2010 to the customer will have suffered sufficient macro-bending loss such that the signal-to-noise ratio in the premises is so low that detection and viewing is not possible. The diameter of the mandrels and the number of loops of cable 2001 about the mandrels is dependent on the macro-bending characteristics of the fiber. Mandrel 2006 can be provided for purposes to be explained with respect to FIG. 3. The skilled artisan is familiar with the minimum signal-to-noise ratio required by TV sets and the like and accordingly can determine how much macro-bending loss is needed to effectively terminate service.

Figure 3:
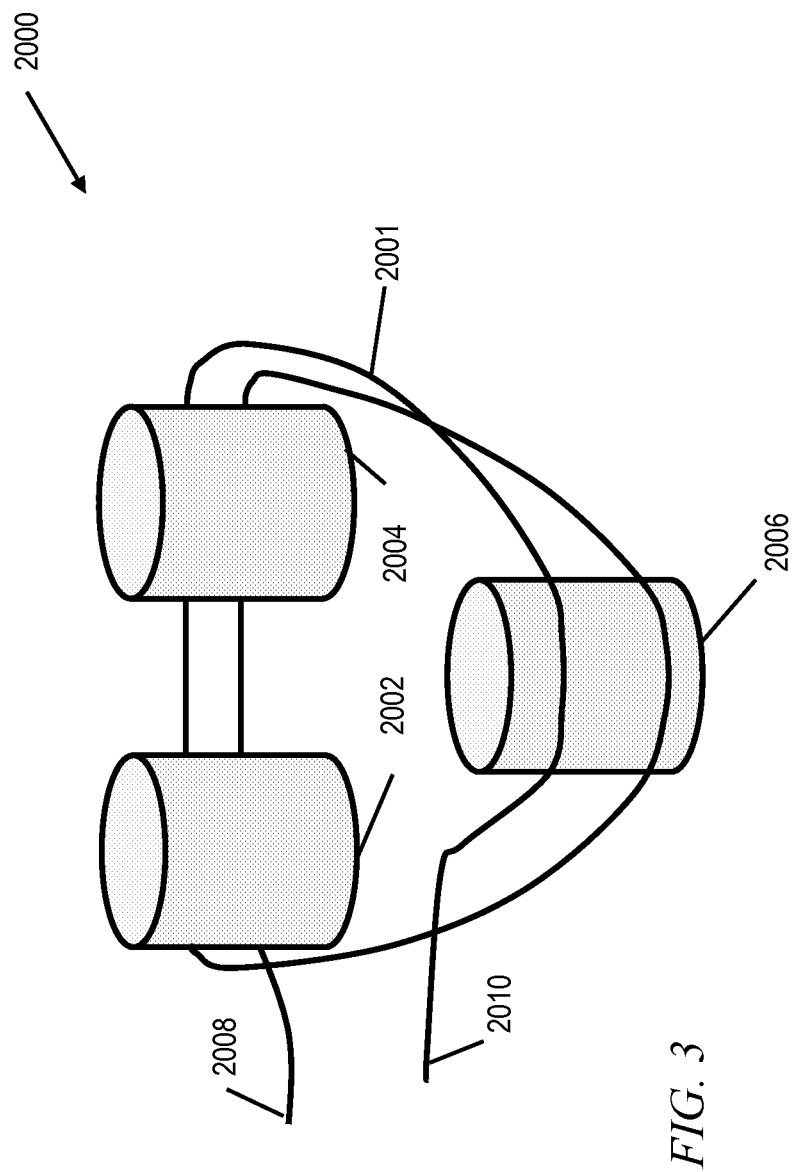
FIG. 3 shows the portions of the exemplary apparatus of FIG. 2, in a "connected" mode.

FIG. 3 shows the same details as FIG. 2 but with the cable 2001 loosely wrapped about mandrels 2002, 2004 and third mandrel 2006 in a manner such that service is not disconnected by macro-bending loss, because the bend radius with the loose wrapping is selected to avoid excessive macro-bending loss. The signal at the feed 2010 to the customer will have suffered little or no macro-bending loss such that the signal-to-noise ratio in the premises is adequate for detection and viewing. FIG. 3 shows but one example of how service could be restored—in general, any path that does not have excessive macro-bending loss can be used; for example, wrapping about a single larger diameter mandrel, loosely looping cable over the two mandrels 2002, 2004 instead of in a tight figure-eight, laying cable loosely in a tray or a separate location, and so on.

In general, cable can be manufactured such that it is highly sensitive to macro-bending or such that it is insensitive to macro-bending. Accordingly, the specific application depends on the nature and specification of the cable, which can be controlled by the MSO or other pertinent entity since they specify and purchase the cable. The MSO or other pertinent entity can install cable that is purposely optimized for the macro-bending service disconnect, although this is not necessary, because macro-bends can be formed in conventional off-the-shelf cables. Accordingly, techniques according to one or more embodiments of the invention may or may not employ fiber specifically designed for control of the macro-bending characteristic.

Thus, in one or more embodiments, the device includes a mandrel 6002 or a series of mandrels 2002, 2004, 2006. A physical service disconnect is performed by "winding" the target fiber strand around the mandrel(s) to induce a controlled amount of macro-bending loss. The amount of loss needed to deny service falls into a range that is easily calculated for any optical network by those skilled in the art. It is not necessary to completely eliminate the optical signal; merely to decrease its intensity to the point where the value of service cannot be received (i.e., signal-to-noise ratio is so low (poor) at the premises that a meaningful viewing experience is not possible) and/or an unauthorized optical transmitter cannot interfere with desired network operation (sufficient macro-bending loss for any upstream light maliciously injected in that the same does not degrade network operation or operation of other components).

Macro-bending loss itself is well understood, and given the teachings herein, the skilled artisan will be able to size and specify mandrel(s) and cable to implement one or more embodiments of the invention. In single mode, the angle increases to the point where, with the index of refraction difference between the core and the cladding, the result is that the light no longer goes down the center of the core but rather exits out the core into the cladding, producing the macro-bending loss.

Another element of one or more embodiments of the invention is a physical security device such as a physical lock, tamper-evident seal, or the like—this can be located, for example, where the connector panel is installed, similar to current installations which do not employ macro-bending disconnect. In some embodiments, the mandrel(s) and lock or seal are located in a curbside cabinet. For example, in one embodiment, an enclosure has a locking door. The door is opened and then all the mandrels are labeled with the corresponding street address, and the technician merely winds the fiber onto one or more of the mandrels (or unwinds it from one or more of the mandrels) depending on which service it is desired to connect or disconnect. Thus, the disconnect mandrels can be located, for example, in an enclosure similar to as a curbside telephone equipment box or a pedestal type enclosure such as the Charles Fiber Flexibility Pedestal (CFFP) available from Charles Industries, Ltd., Rolling Meadows, Ill., USA. Thus, as in a connector or splice based physical disconnect, it is desirable to physically secure the disconnect mechanism to prevent unauthorized reconnection. This can be accomplished using commonly available techniques such as locking and tamper resistant enclosures already developed and deployed.

Figure 4:
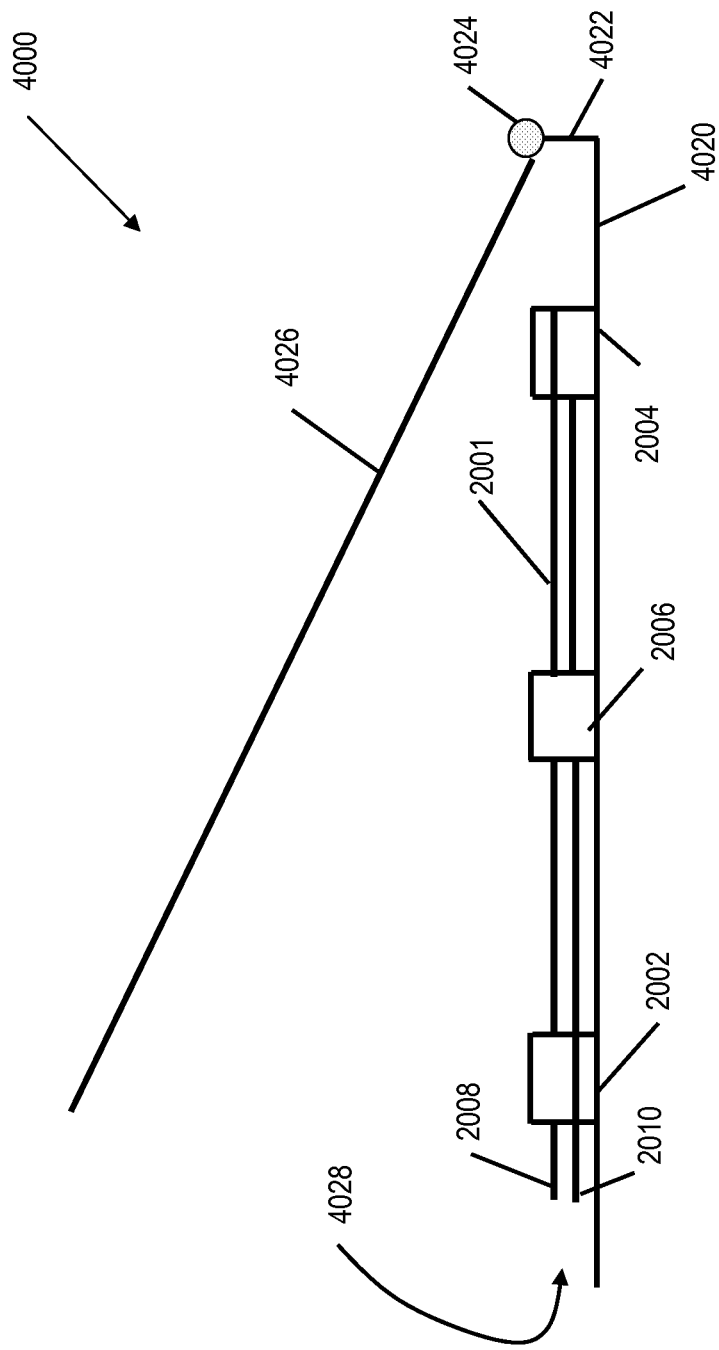
FIG. 4 shows the portions of the exemplary apparatus of FIG. 2 within the context of an exemplary embodiment of the service connect-disconnect apparatus, according to another aspect of the invention.

With reference to FIG. 4, note the portions of the exemplary apparatus of FIG. 2 within the context of an exemplary embodiment of a service connect-disconnect apparatus 4000. Note mandrels 2002, 2004, 2006, with cable 2001 wrapped in a single figure-eight about mandrels 2002, 2004 only. This is an edge view. Mandrels 2002, 2004, 2006 may, for example, be injection-molded plastic, molded integrally with a base plate 4020 having an upstanding wall 4022. A suitable cover 4026 may be hinged to wall 4022 with hinge 4024 (or with a living hinge as is known in the plastics art). Cover 4026 is shown in an open position but may be closed to prevent cable 2001 from unwinding from mandrels 2002, 2004, 2006. Region 4028 may be formed, for example, without a wall to provide ingress and egress for the network feed 2008 and feed to the customer 2010 of cable 2001. The other three sides of base plate 4020 may have wall 4022, for example.

In another approach 6000 as per FIG. 6, a single mandrel 6002 could be employed. A full-strength signal may be present on network feed 6008, which signal is then effectively disconnected by wrapping the fiber strand 6001 around the mandrel 6002 such that the signal at the feed 6010 to the customer will have suffered sufficient macro-bending loss (based on the radius and the number of turns) so that the signal-to-noise ratio in the premises is so low that detection and viewing is not possible. When it is desired to restore service, cable 6001 could be wrapped about a much larger mandrel (identical to mandrel 6002 except for being of a larger diameter) or cable 6001 could be loosely laid in a tray (for example, the device of FIG. 4 could be as shown but with a single mandrel and the cable loosely laid in place and secured by cover 4026.

Other construction techniques besides injection molding can be employed. A snap-on cover instead of hinged cover 4026 could be employed. Many other variations are possible.

Figure 5:
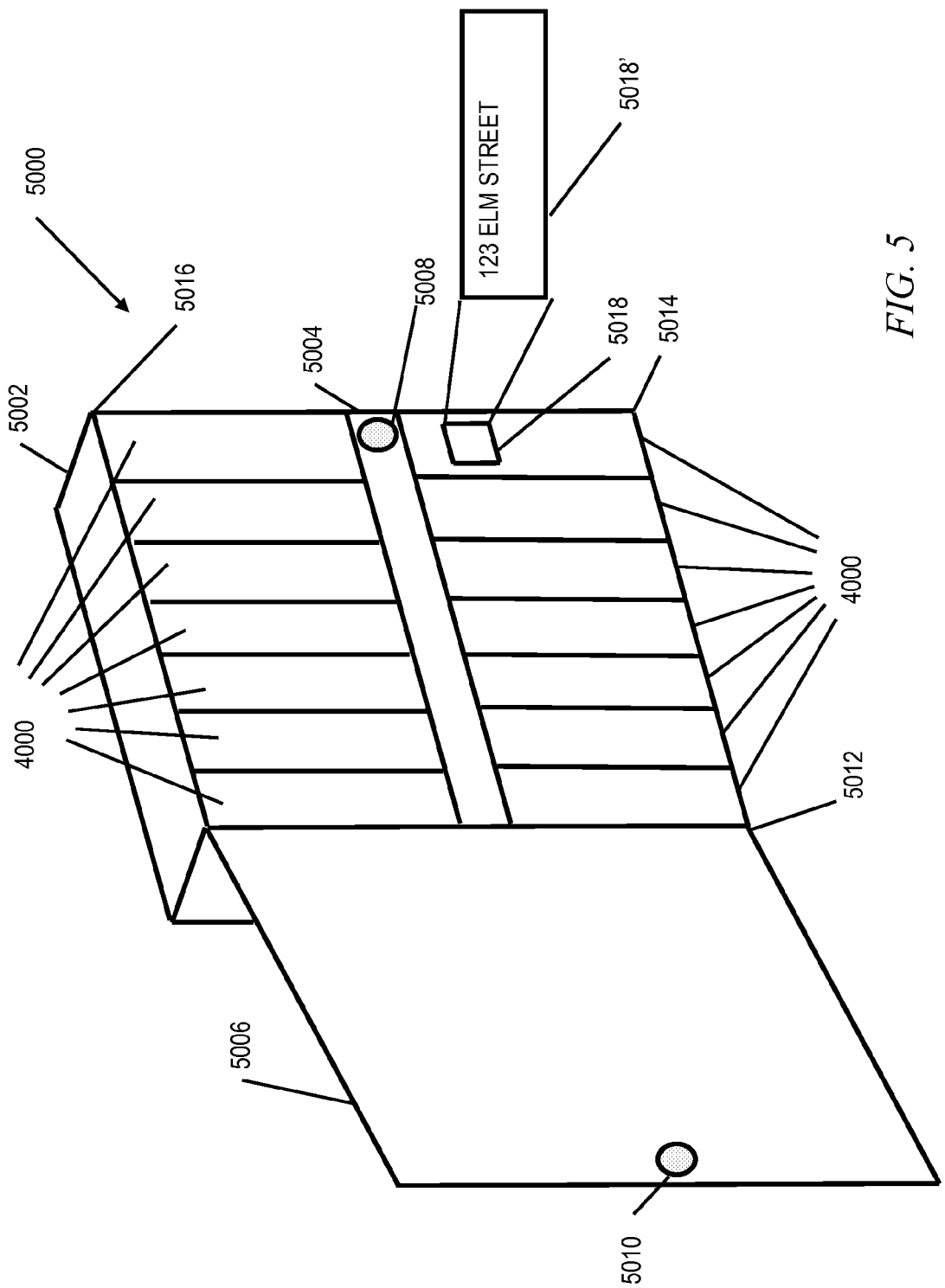
FIG. 5 shows a number of the exemplary apparatuses within an exemplary cabinet, according to still another aspect of the invention.

FIG. 5 shows a view 5000 with a number of the exemplary apparatuses 4000 within an exemplary cabinet 5002, which could be used, for example, at locations 182. The apparatuses 4000 could employ a variety of configurations, e.g., three mandrels as in FIG. 4, single mandrel as in FIG. 6, and so on. A central region 5004 could be provided to accommodate cabling, with the open end 4028 of each apparatus 4000 located adjacent region 5004. The hinges 4024 could be located at edges 5016, 5014, for example. A security cover 5006 may be provided and may be hinged at location 5012. A lock or the like may be provided at 5010, 5008 to lock cover 5006. Each apparatus 4000 may have a label 5018 (only one is shown for illustrative convenience). The label is shown in enlarged form at 5018'. In this instance, there may be a neighborhood of single-family homes such that simply listing the subscriber's address, here 123 Elm Street, may be sufficient to identify the subscriber. In other instances, an apartment number or even a subscriber name may be required (if multiple subscribers are in the same home).

Macro-bending is also wavelength dependent, and this dependency may potentially be used to deny service using one wavelength while allowing service using a different wavelength. That is, sufficient turns at a sufficiently tight radius could be used to deny service on a first wavelength, while at a second wavelength, the same radius and number of turns might not result in an amount of macro-bending loss sufficient to effectively disconnect service.

Figure 7:
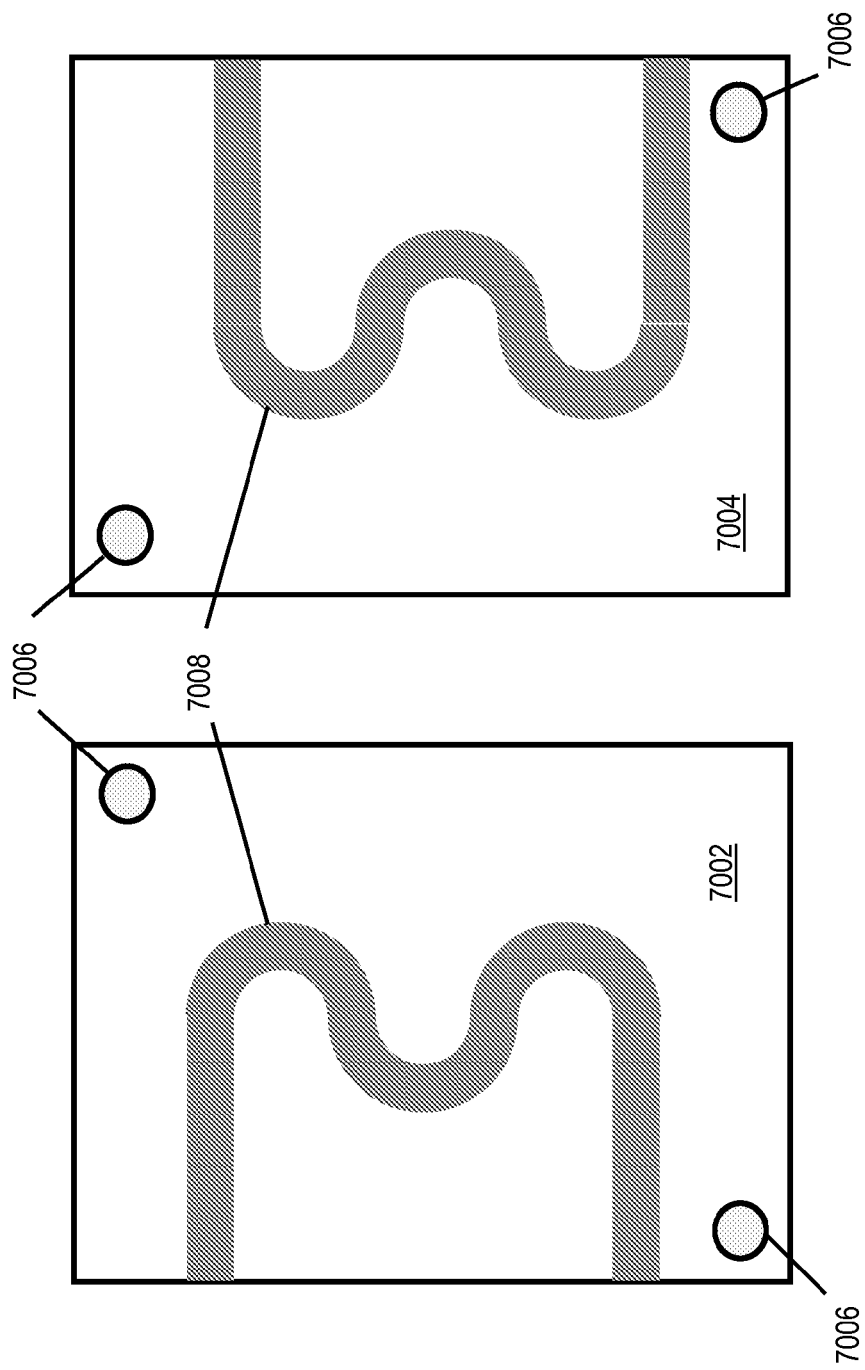
FIG. 7 shows an alternative embodiment of a service connect-disconnect apparatus, in accordance with a further aspect of the invention.

FIG. 7 shows an alternative embodiment of a service connect-disconnect apparatus. Mating halves 7002, 7004 "snap" together using snap fasteners 7006. The fiber optic cable is placed within tortuous channel 7008. Here, the channel has three semi-circular bends comprising 540 degrees of arc. The halves could be hinged together or could fasten in an alternative manner as well. In the example, each side has a channel with a depth slightly greater than the radius of the cable; in other embodiments, one side might have a groove with a depth just greater than that of the cable's diameter and the other side could just be a flat cover such as 4026. Structures employing the techniques of FIG. 7 can be substituted for structures using one or more mandrels.

Macro-Bending Aspects

Figure 8:
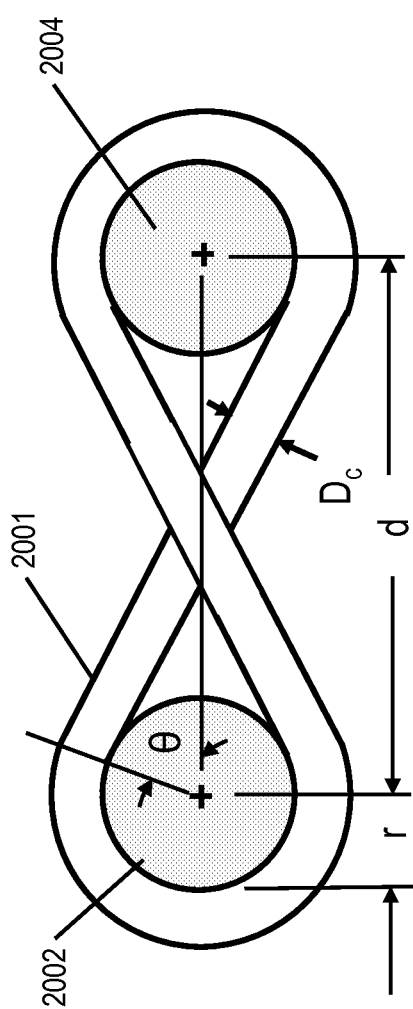
FIG. 8 shows exemplary geometric calculations.

Given the teachings herein, the skilled artisan will be able to configure and dimensions apparatuses in accordance with embodiments of the invention. For example, the manufacturer may provide the attenuation per radian at a given radius. The skilled artisan, with such information, will be able to determine how many turns are required to obtain a desired optical attenuation (for example, 20 db), which translates into a corresponding RF attenuation (in this example, 40 db). Such amounts of attenuation are sufficient to put even the most noise-free signals deep enough into the noise floor such that reception is not possible. In general, at a given radius of bending, there will be a known amount of loss (in dB) per radian (or other unit such as degrees, turns, and so on—the skilled artisan can readily convert given that 1 turn=360 degrees=$2\pi$ radians). The skilled artisan will appreciate that a relatively noise free RF QAM signal may have, for example, a 50 db carrier-to-noise ratio, and that at least about 25 db carrier-to-noise ratio is required for reasonable reception. In one or more embodiments, to ensure service disconnect, ensure sufficient macro-bending loss such that even such a relatively noise free RF QAM signal is sufficiently degraded to cut off service. In an example, taking into account the 2:1 relationship between RF and optical, ensure at least 20 dB of macro-bending loss in the optical signal, with 40 dB of RF loss. Knowing the loss per radian at a given radius, the number of turns required at a given radius to obtain the desired attenuation can be readily calculated. Where configurations other than a pure wrapping about a single mandrel are used (e.g., a figure-eight shape), the skilled artisan can calculate the number of degrees or radians of bend for each figure-eight wrap using geometric considerations. For example, in FIG. 7, add up the number of half-turns (three in the example) and multiply by 180 degrees to obtain the total number of degrees. In a figure-eight, as seen in FIG. 8, two mandrels of radius r are spaced a distance d apart. The cable has a diameter $D_c$ and thus a radius of $D_c/2$. For a single figure eight, one mandrel provides 360-2 arc cosine $(2(r+D_c/2)/d)$ degrees of turn, and both mandrels together provide twice that amount. This is because theta is the angle whose cosine is given by $(r+D_c/2)/(d/2)$, with measurement to the center of the cable. As d becomes very large compared to r, the number of degrees provided by a single mandrel approaches 180.

In some circumstances, fibers which are especially susceptible to macrobending loss may be used to implement connect/disconnect techniques; these fibers may differ from fibers employed elsewhere in the video content network and may be spliced or otherwise coupled thereto.

Recapitulation

Given the discussion thus far, it will be appreciated that, in general terms, an exemplary method, according to an aspect of the invention, includes the step of determining that service is to be disconnected for at least a first subscriber (e.g., corresponding to one of the CPEs 106 in FIG. 1D) of a video content network 101 employing at least one fiber optic cable. The service to the at least first subscriber is provided from a cross-connect cabinet (e.g., 182'), over the at least one fiber optic cable (e.g., 889), to a premises of the at least first subscriber. An additional step includes deliberately inducing sufficient macro-bending loss in the at least one fiber optic cable 889 so as to cause a signal-to-noise ratio at the premises (e.g., location of one of the CPEs 106 in FIG. 1D) to degrade such that the service is disconnected. The macro-bending loss is induced in a portion of the at least one fiber optic cable (e.g., 889) which services only the first subscriber.

In one or more embodiments, the cable is a single mode fiber optic cable.

In at least some instances, the service provided over the at least one fiber optic cable 889 in which the macro-bending loss is deliberately induced is a cable television service.

In one or more embodiments, the inducing includes winding the fiber optic cable 6001 a predetermined number of turns about at least one mandrel 6002 having a radius. The predetermined number of turns and the radius are selected to induce the sufficient macro-bending loss.

In some cases, the inducing includes winding the fiber optic cable 2001 a predetermined number of times, in a figure-eight pattern, about at least two mandrels 2002, 2004, having predetermined radii r and separated by a predetermined distance d. The predetermined number of times, the distance d, and the radii r are selected to induce the sufficient macro-bending loss.

In another aspect, the inducing is implemented by retaining said fiber optic cable in a tortuous groove 7008 in a tray; said tortuous groove is configured and dimensioned to induce said sufficient macro-bending loss.

Service can be reconnected as discussed elsewhere herein. For example, an additional step can include determining that the service which was disconnected is to be re-connected (e.g., a new person moves in and subscribes; previous person re-subscribes and brings account current, etc.). For re-connection, an additional step can include deliberately removing the sufficient macro-bending loss in the at least one fiber optic cable so as to cause the signal-to-noise ratio at the premises to be sufficiently strong such that the service is re-connected. In at least some cases, the re-connection includes winding the at least one fiber optic cable about a path having a greater effective radius than under disconnected conditions. As used herein, a greater effective radius includes a configuration with less macro-bending loss than in the disconnected configuration, such that service is restored, and includes, by way of example, wrapping about a single mandrel having a greater radius than used for the disconnected configuration, wrapping about extra mandrels, wrapping about the same mandrels but loosely, and so on.

In some cases, the determining step may include determining that the service is to be disconnected for at least one wavelength, but not all wavelengths, carried by the at least one fiber optic cable; and the inducing step can include bending the cable a predetermined amount (e.g., number of times or turns) at a predetermined effective radius so as to cause the signal-to-noise ratio at the premises to degrade such that the service is disconnected for the at least one wavelength, but not for all the wavelengths carried by the at least one fiber optic cable.

In another aspect, an exemplary kit of parts for service disconnect of a service provided over at least one fiber optic cable includes a tray structure 4020 having at least a first mandrel 2002, 2004, 2006, 6002 projecting therefrom, or a structure similar to that described with respect to FIG. 7. The at least first mandrel (or the tortuous groove, as the case may be) is configured and dimensioned to effectuate the service disconnect via sufficient macro-bending loss in the at least one fiber optic cable 2001, 6001. The kit also includes a cover 4026 securable to the tray structure so as to retain the at least one fiber optic cable in relation to the at least first mandrel (or the tortuous groove, as the case may be), as well as a set of instructions directing a user of the kit to wind the at least one fiber optic cable about the at least first mandrel (or locate the cable in the tortuous groove, as the case may be) so as to induce the sufficient macro-bending loss to effectuate the service disconnect.

The kit would typically not include the cable per se. The kit could include parts for multiple units 4000 to be arranged in a cabinet 5002.

In some cases, the at least first mandrel 6001 has a radius, and the instructions instruct the user to wind the at least one fiber optic cable 6001 a predetermined number of turns about the at least first mandrel. The predetermined number of turns and the radius are selected to induce the sufficient macro-bending loss.

In some instances, the at least first mandrel 2002 further comprises at least a second mandrel 2004, and the instructions instruct the user to wind the at least one fiber optic cable 2001 a predetermined number of times, in a figure-eight pattern, about the at least first and second mandrels. The at least first and second mandrels have predetermined radii r and are separated by a distance d, and the predetermined number of times, the distance d, and the radii r are selected to induce the sufficient macro-bending loss.

In some cases, the instructions further instruct the user to deliberately remove the sufficient macro-bending loss in the at least one fiber optic cable so as to cause the service to be re-connected by reducing the sufficient macro-bending loss; for example, by instructing the user to wind the at least one fiber optic cable about a path having a greater effective radius than under disconnected conditions, in order to cause the service to be re-connected by reducing the sufficient macro-bending loss.

In still another aspect, an apparatus includes at least one fiber optic cable 2001, 6001; a tray structure 4020 having at least a first mandrel 2002, 2004, 2006, 6002 projecting therefrom, or a structure similar to that described with respect to FIG. 7. The at least first mandrel (or the tortuous groove, as the case may be) is configured and dimensioned to effectuate service disconnect for a service provided over the at least one fiber optic cable via inducing sufficient macro-bending loss in the at least one fiber optic cable. The apparatus further includes a cover 4026 secured to the tray structure so as to retain the at least one fiber optic cable in relation to the at least first mandrel (or the tortuous groove, as the case may be). The at least one fiber optic cable is wound about the at least first mandrel (or located in the tortuous groove, as the case may be) so as to induce the sufficient macro-bending loss to effectuate the service disconnect.

In some cases, the at least first mandrel 6002 has a radius, and the at least one fiber optic cable 6001 is wound a predetermined number of turns about the at least first mandrel, with the predetermined number of turns and the radius being selected to induce the sufficient macro-bending loss.

In some instances, the at least first mandrel 2002 further comprises at least a second mandrel 2004, and the at least one fiber optic cable 2001 is wound a predetermined number of times, in a figure-eight pattern, about the at least first and second mandrels. The at least first and second mandrels have predetermined radii r and are separated by a distance d, and the predetermined number of times, the distance d, and the radii r are selected to induce the sufficient macro-bending loss.

The apparatus optionally includes an alternative path for the at least one fiber optic cable to effectuate a re-connection of the service. The alternative path has a greater effective radius than under disconnected conditions, in order to cause the service to be re-connected by reducing the sufficient macro-bending loss. In one non-limiting example, the at least first mandrel 6002 has a radius, and the alternative path comprises at least a second mandrel having a larger radius than that of the at least first mandrel, the larger radius being selected to reduce the sufficient macro-bending loss and restore the service (the second mandrel could just be a larger version of mandrel 6002 and is not separately illustrated). In another non-limiting example, the at least first mandrel 2002 further comprises at least second and third mandrels 2004, 2006, and the alternative path includes wrapping the at least one fiber optic cable 2001 about the first, second, and third mandrels to achieve the greater effective radius, as seen in FIG. 3.

In yet another aspect, a video content network 101 includes a head end 150, a cross-connect cabinet 182' coupled to the head end, and a plurality of macro-bending service disconnect apparatuses 4000 located at the cross-connect cabinet 182'. Also included are a plurality of consumer premises terminals (e.g., CPE 106) coupled to the head end through the plurality of macro-bending service disconnect apparatuses. The plurality of consumer premises terminals are coupled to the plurality of macro-bending service disconnect apparatuses by single strands of optical fiber cable 889. The plurality of macro-bending service disconnect apparatuses each comprise at least one structural member configured to deliberately induce sufficient macro-bending loss in a corresponding one of the single strands of fiber optic cable so as to cause a signal-to-noise ratio at a corresponding one of the consumer premises terminals to degrade such that service thereto is disconnected. In at least some cases, the service provided over the corresponding one of the single strands of fiber optic cable 889 in which the macro-bending loss is deliberately induced includes at least a cable television service.

In some embodiments, the at least one structural member includes at least a first mandrel 6002 having a radius and the corresponding one of the single strands of fiber optic cable 6001 is wound about the at least first mandrel a predetermined number of turns, the predetermined number of turns and the radius being selected to induce the sufficient macro-bending loss.

In some instances, the at least one structural member comprises at least first and second mandrels 2002, 2004 having radii, and separated by a distance d (the distance d shown in the examples herein is center-to-center but could be specified in different ways), and the corresponding one of the single strands of fiber optic cable 2001 is wound about the at least first and second mandrels a predetermined number of times, in a figure-eight pattern, the predetermined number of times, the distance d, and the radii r being selected to induce the sufficient macro-bending loss.

It is preferred that the plurality of macro-bending service disconnect apparatuses 4000 each further comprise an alternative path for corresponding ones of the single strands of fiber optic cable to effectuate service re-connection. The alternative paths (various examples presented above) have a greater effective radius than under disconnected conditions, in order to cause the service re-connection by reducing the sufficient macro-bending loss so as to cause the signal-to-noise ratio at corresponding ones of the consumer premises terminals 106 to be sufficiently strong such that the service is re-connected.

In some cases, the macro-bending loss is induced such that the service is to be disconnected for at least one wavelength, but not all wavelengths, carried by a corresponding one of the single strands of fiber optic cable.

In some cases, the at least one structural member comprises a tray having a tortuous groove 7008 therein. The tortuous groove is configured and dimensioned to induce said sufficient macro-bending loss. The corresponding one of said single strands of fiber optic cable is retained in said tortuous groove.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
   determining that service is to be disconnected for at least a first subscriber of a video content network employing at least one fiber optic cable, said service to said at least first subscriber being provided from a cross-connect cabinet, over said at least one fiber optic cable, to a premises of said at least first subscriber; and
   deliberately inducing sufficient macro-bending loss in said at least one fiber optic cable so as to cause a signal-to-noise ratio at said premises to degrade such that said service is disconnected;
   wherein, in said inducing step, said macro-bending loss is induced in a portion of said at least one fiber optic cable which services only said first subscriber.

2. The method of claim 1, wherein, in said inducing step, said at least one fiber optic cable comprises a single mode fiber optic cable.

3. The method of claim 2, wherein said service provided over said at least one fiber optic cable in which said macro-bending loss is deliberately induced comprises at least a cable television service.

4. The method of claim 3, wherein said inducing comprises winding said fiber optic cable a predetermined number of turns about at least one mandrel having a radius, said predetermined number of turns and said radius being selected to induce said sufficient macro-bending loss.

5. The method of claim 3, wherein said inducing comprises winding said fiber optic cable a predetermined number of times, in a figure-eight pattern, about at least two mandrels having predetermined radii and a predetermined distance therebetween, said predetermined number of times, said radii, and said predetermined distance being selected to induce said sufficient macro-bending loss.

6. The method of claim 3, wherein said inducing comprises retaining said fiber optic cable in a tortuous groove in a tray, said tortuous groove being configured and dimensioned to induce said sufficient macro-bending loss.

7. The method of claim 3, further comprising:
determining that said service which was disconnected is to be re-connected; and
deliberately removing said sufficient macro-bending loss in said at least one fiber optic cable so as to cause said signal-to-noise ratio at said premises to be sufficiently strong such that said service is re-connected.

8. The method of claim 7, wherein said removing comprises winding said at least one fiber optic cable about a path having a greater effective radius than under disconnected conditions.

9. The method of claim 3, wherein:
said determining step comprises determining that said service is to be disconnected for at least one wavelength, but not all wavelengths, carried by said at least one fiber optic cable; and
said inducing step comprises bending said cable a predetermined amount at a predetermined effective radius so as to cause said signal-to-noise ratio at said premises to degrade such that said service is disconnected for said at least one wavelength, but not for all said wavelengths carried by said at least one fiber optic cable.

10. A kit of parts for service disconnect of a service provided over at least one fiber optic cable, comprising:
a tray structure having at least one of:
at least a first mandrel projecting therefrom, said at least first mandrel being configured and dimensioned to effectuate the service disconnect via sufficient macro-bending loss in the at least one fiber optic cable; and
a tray having a tortuous groove therein, said tortuous groove being configured and dimensioned to induce said sufficient macro-bending loss;
a cover securable to said tray structure so as to retain the at least one fiber optic cable in relation to said at least one of said at least first mandrel and said tortuous groove; and
a set of instructions directing a user of said kit to carry out at least one of winding the at least one fiber optic cable about said at least first mandrel, and locating the at least one fiber optic cable in the tortuous groove, so as to induce the sufficient macro-bending loss to effectuate the service disconnect.

11. The kit of claim 10, wherein said at least first mandrel has a radius, and wherein said instructions instruct the user to wind the at least one fiber optic cable a predetermined number of turns about said at least first mandrel, said predetermined number of turns and said radius being selected to induce the sufficient macro-bending loss.

12. The kit of claim 10, wherein said at least first mandrel further comprises at least a second mandrel, and wherein said instructions instruct the user to wind the at least one fiber optic cable a predetermined number of times, in a figure-eight pattern, about said at least first and second mandrels, said at least first and second mandrels having predetermined radii and a predetermined distance therebetween, said predetermined number of times, said radii, and said predetermined distance being selected to induce the sufficient macro-bending loss.

13. The kit of claim 10, wherein said instructions further instruct the user to deliberately remove the sufficient macro-bending loss in said at least one fiber optic cable so as to cause the service to be re-connected by reducing the sufficient macro-bending loss.

14. An apparatus comprising:
at least one fiber optic cable;
a tray structure having at least one of:
at least a first mandrel projecting therefrom, said at least first mandrel being configured and dimensioned to effectuate service disconnect for a service provided over said at least one fiber optic cable via inducing sufficient macro-bending loss in said at least one fiber optic cable; and
a tray having a tortuous groove therein, said tortuous groove being configured and dimensioned to induce said sufficient macro-bending loss; and
a cover secured to said tray structure so as to retain said at least one fiber optic cable in relation to at least one of said at least first mandrel and said tortuous groove;
wherein said at least one fiber optic cable is at least one of:
wound about said at least first mandrel so as to induce said sufficient macro-bending loss to effectuate said service disconnect; and
located in said tortuous groove so as to induce said sufficient macro-bending loss to effectuate said service disconnect.

15. The apparatus of claim 14, wherein said at least first mandrel has a radius, and wherein said at least one fiber optic cable is wound a predetermined number of turns about said at least first mandrel, said predetermined number of turns and said radius being selected to induce said sufficient macro-bending loss.

16. The apparatus of claim 14, wherein said at least first mandrel further comprises at least a second mandrel, and said at least one fiber optic cable is wound a predetermined number of times, in a figure-eight pattern, about said at least first and second mandrels, said at least first and second mandrels having predetermined radii and a predetermined distance therebetween, said predetermined number of times, said radii, and said predetermined distance being selected to induce said sufficient macro-bending loss.

17. The apparatus of claim 14, further comprising an alternative path for said at least one fiber optic cable to effectuate a re-connection of said service, said alternative path having a greater effective radius than under disconnected conditions, in order to cause said service to be re-connected by reducing said sufficient macro-bending loss.

18. The apparatus of claim 17, wherein said at least first mandrel has a radius, and wherein said alternative path comprises at least a second mandrel having a larger radius than that of said at least first mandrel, said larger radius being selected to reduce said sufficient macro-bending loss and restore said service.

19. The apparatus of claim 17, wherein said at least first mandrel further comprises at least second and third mandrels, and wherein said alternative path comprises wrapping said at least one fiber optic cable about said first, second, and third mandrels to achieve said greater effective radius.

20. A video content network, comprising:
a head end;
a cross-connect cabinet coupled to said head end;
a plurality of macro-bending service disconnect apparatuses located at said cross-connect cabinet; and
a plurality of consumer premises terminals coupled to said head end through said plurality of macro-bending service disconnect apparatuses, said plurality of consumer premises terminals being coupled to said plurality of macro-bending service disconnect apparatuses by single strands of optical fiber cable;

wherein said plurality of macro-bending service disconnect apparatuses each comprise at least one structural member configured to deliberately induce sufficient macro-bending loss in a corresponding one of said single strands of fiber optic cable so as to cause a signal-to-noise ratio at a corresponding one of said consumer premises terminals to degrade such that service thereto is disconnected; and wherein said service provided over said corresponding one of said single strands of fiber optic cable in which said macro-bending loss is deliberately induced comprises at least a cable television service.

21. The video content network of claim 20, wherein said at least one structural member comprises at least a first mandrel having a radius and wherein said corresponding one of said single strands of fiber optic cable is wound about said at least first mandrel a predetermined number of turns, said predetermined number of turns and said radius being selected to induce said sufficient macro-bending loss.

22. The video content network of claim 20, wherein said at least one structural member comprises at least first and second mandrels having radii and a predetermined distance therebetween and wherein said corresponding one of said single strands of fiber optic cable is wound about said at least first and second mandrels a predetermined number of times, in a figure-eight pattern, said predetermined number of times, said radii, and said predetermined distance being selected to induce said sufficient macro-bending loss.

23. The video content network of claim 20, wherein said plurality of macro-bending service disconnect apparatuses each further comprise an alternative path for corresponding ones of said single strands of fiber optic cable to effectuate service re-connection, said alternative paths having a greater effective radius than under disconnected conditions, in order to cause said service re-connection by reducing said sufficient macro-bending loss so as to cause said signal-to-noise ratio at corresponding ones of said consumer premises terminals to be sufficiently strong such that said service is re-connected.

24. The video content network of claim 20, wherein said macro-bending loss is induced such that said service is to be disconnected for at least one wavelength, but not all wavelengths, carried by a corresponding one of said single strands of fiber optic cable.

25. The video content network of claim 20, wherein said at least one structural member comprises a tray having a tortuous groove therein, said tortuous groove being configured and dimensioned to induce said sufficient macro-bending loss, said corresponding one of said single strands of fiber optic cable being retained in said tortuous groove.

* * * * *